Jan. 15, 1929.
B. S. MOORE
1,698,960
RIM LOCK
Original Filed Feb. 28, 1927
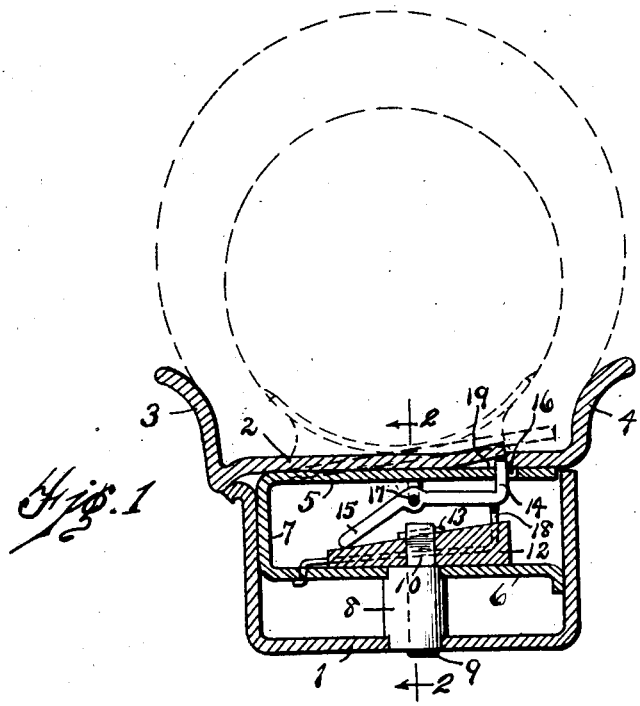
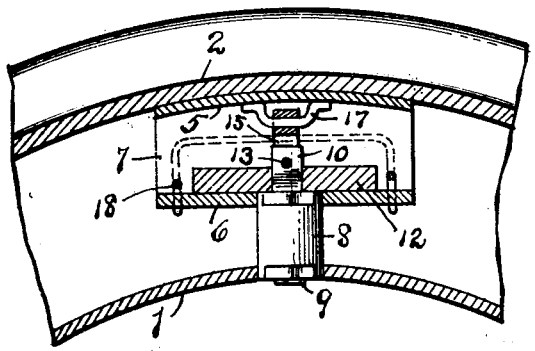
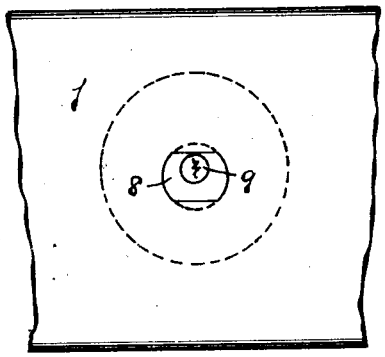
INVENTOR
Benjamin S. Moore
BY Edward N. Pagelsen
ATTORNEY.

Patented Jan. 15, 1929.

1,698,960

UNITED STATES PATENT OFFICE.

BENJAMIN S. MOORE, OF DETROIT, MICHIGAN.

RIM LOCK.

Application filed February 28, 1927, Serial No. 171,394. Renewed June 2, 1928.

This invention relates to devices for preventing the unauthorized removal of automobile tires and rims from their supports, such as the fellies of wheels and spare-tire carriers, and its object is to provide simple and effective means whereby such removal is rendered possible only upon the insertion of a proper key.

This invention consists in a keeper movably mounted within a casing secured within a support and a spring to normally hold the keeper in a notch formed in the demountable rim, together with key operated means for withdrawing the keeper from said notch to permit the removal of the rim and the tire mounted thereon.

It further consists of the details of construction illustrated in the accompanying drawing and particularly pointed out in the claims.

In the drawing:—

Fig. 1 is a radial section of a tire rim and of this improved rim-securing device;

Fig. 2 is a section on the line 2—2 of Fig. 1;

Fig. 3 is a plan of a section of felly equipped with this improved rim retainer.

Similar reference characters refer to like parts throughout the several views.

The felly 1 is of the usual channel type and the rim 2 is provided with the usual flanges 3 and 4. Within the felly is secured a casing comprising the two plates 5 and 6 and the connecting side member 7. Secured to the felly and to the plate 6 is the body 8 of a well known lock whose barrel 9 has an extension 10 with flattened sides fitting in a similarly shaped hole in a disk 12 which is beveled or wedge-shaped, a pin 13 extending through a hole in the extension 10 holding the disk in position.

A lever having an arm 15 resting on the disk and its other arm 14 bent to extend through a hole 16 in the plate 5 is pivoted on a stirrup 17 attached to the plate 5. The end of the arm 14 is pressed outward by a loop spring 18 whose ends are attached to the plate 6. The rim 2 is formed with a recess 19 to receive the end of the arm 14 as shown in Fig. 1.

When the rim is slipped onto the felly, the foreward or leading edge engages the end of the arm 14 and depresses it against the spring 18 so that the rim may slide over this arm until the recess 19 registers therewith, when the spring presses the arm outward. The rim is now locked on the felly until a proper key is inserted and the lock barrel and disk 12 are turned to swing the arm 14 out of this recess, when the rim may be removed.

In constructing the case, I prefer to secure the side 7 and the turned edge of the plate 6 to the felly or tire carrier, the plate 5 being unattached at its free edge as shown in Fig. 1. This case is so formed that the plate 5 normally extends at a slight angle to the plate 6 and therefore will be pressed inwardly to the position shown in Fig. 1 when the rim is mounted on its support. This does away with all possibility of rattling at this point.

It is evident that this lock may be mounted in a rim carrier, that is, that the representation of felly shown may be a representation of a section of a tire carrier. The details of construction and proportions of the parts may all be changed by those skilled in the art without departing from the spirit of my invention as set forth in the following claims.

I claim:—

1. A rim lock comprising a case adapted to be mounted in a tire-rim support, a lever pivoted in said case and having one end adapted to extend through an opening in the case into a recess in a rim mounted on said support to lock it in position, and key operated means to swing said lever to withdraw said end from said recess to release the rim.

2. A rim lock comprising a case adapted to be mounted in a tire-rim support, a lever pivoted in said case and having one end adapted to extend through an opening in the case into a recess in a tire-rim mounted on said support to lock it in position, a wedge-shaped disk contacting with the other arm of the lever, and key-operated means to move said disk to swing said lever to withdraw it from the recess in the tire-rim.

3. A rim lock comprising a case adapted to be mounted in a tire-rim support, a lever pivoted in said case and having one end adapted to extend through an opening in the case into a recess in a tire-rim mounted on said support to lock it in position, a spring to press said end of the lever into said recess, a wedge-shaped disk contacting with the other arm of the lever, and key-operated means to move said disk to swing said lever to withdraw it from the recess in the tire-rim against the force of said spring.

4. In a rim lock, the combination of a case mounted in a tire-rim support and comprising an inner plate rigidly secured to said support and a resilient and apertured cover plate attached at one end to said support and having its free end adapted to engage a rim mounted on the support to prevent the rim from rattling, a movable member mounted between said plates and having a portion projecting through the aperture in the cover plate adapted to engage a rim on said support, a spring to move said member into such engagement, and key operated means to withdraw said member from such engagement.

BENJAMIN S. MOORE.